United States Patent Office 2,990,382
Patented June 27, 1961

2,990,382
COMPOSITION COMPRISING HYDRAULIC CEMENT, METHYL CELLULOSE AND REEMULSIFIABLE POLYVINYL ACETATE, METHOD OF PREPARING SAME AND MORTAR PREPARED THEREFROM
Herman B. Wagner, Blooming Glen, Pa., and John Vincent Fitzgerald, Metuchen, N.J., assignors to Tile Council of America, Inc., a corporation of New York
No Drawing. Filed Oct. 9, 1958, Ser. No. 766,197
10 Claims. (Cl. 260—17)

This invention relates to novel compositions of matter, and to their method of manufacture, particularly useful as mortar compositions for the application of tile to surfaces and for filling the joints between edges of tile. More particularly, the compositions of this invention comprise a hydraulic cement such, for example, as Portland cement, methyl cellulose of medium to high viscosity, and water-insoluble, reemulsifiable polyvinyl acetate.

Much ceramic tile is of the absorptive type; if such absorptive tile, in a dry condition, is brought into contact with a conventional hydraulic cement mortar, the water phase of the latter is absorbed by the tile. In this manner the water is withdrawn from the mortar, and the hydraulic cement does not harden properly or bond to the tile. Likewise, when a conventional mortar is applied over a dry, porous backing such as concrete, or cinder block, gypsum wall board, or brick, this same phenomenon occurs, with the same lack of proper hardening and bonding. It is accordingly common practice to water-soak absorptive tile immediately prior to setting and to wet-down porous backings. The soaking of the tile and the wetting of the surface to which the tile is to be applied are extra steps which add to the time necessary to make the installation, and, therefore, add to the cost. Also, very often the wetting of the surface to which the mortar composition is to be applied results in dimensional instability of the wetted surface.

Ceramic tile mortar compositions comprising Portland cement and water when used for filling the joints between edges of tile also have another disadvantage which is more difficult to overcome. Immediately after the installation is made, water begins to evaporate from the surface of the joints and unless the humidity at the site of the installation is kept above a certain minimum, water loss is so high that, again, the Portland cement does not set properly, and soft and chalky joints may result. If an attempt is made to overcome this water loss by increasing the proportion of water in the mortar, the mortar becomes too thin to work properly and may not even be retained in the joints completely, especially if the installation is overhead. High water-mortar ratio also leads to cracking due to excessive shrinkage of the mortar during curing.

Besides having the property of sufficient water retention, it is also highly desirable for mortars to have proper working consistency, good adhesive properties, and proper hardness after setting.

In many applications of mortar compositions, it is essential that the cured composition possesses good flexibility. Conventional hydraulic cements do not possess good flexibility characteristics. Prior to this invention, it was known that an improvement in the flexibility of Portland cement could be effectuated by adding to Portland cement a liquid emulsion of polyvinyl acetate. Such a procedure is reported in Geist and Mellor, Industrial and Engineering Chemistry, vol. 45, page 759, No. 4, 1953. Although liquid emulsions of polyvinyl acetate are useful in improving flexibility characteristics of Portland cement, a considerable number of drawbacks accompany their use. Among the disadvantages accompanying use of the liquid emulsion are that (a) at least two constituents must be separately stored, transported, handled, and mixed on the use site, (b) the liquid emulsion is unstable below the freezing point of water, and thus requires special precautions to be taken during storage and transportation in cold weather, and (c) very careful proportioning of the liquid emulsion and the hydraulic cement is required and personnel in the field are frequently unable to meet this requirement. Mixing errors, where such emulsions are used, are the rule rather than the exception.

Objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention consists in the novel steps, methods, compositions, combinations and improvements herein shown and described.

Accordingly, it is an object of this invention to provide a novel method for the manufacture of a hydraulic cement composition having improved characteristics. A further object of this invention is to provide a novel method for the manufacture of an improved mortar composition which may be used for applying tile to the surface and for filling joints between the edges of ceramic tile, said mortar composition possessing unique dry curing properties whereby it resists water loss so that it sets properly even under dry conditions. A still further object of this invention is to provide a novel method for the manufacture of an improved hydraulic cement having improved physical properties, and particularly improved flexibility and bonding properties. Yet a further object of this invention is to provide improved hydraulic cement compositions, and particularly Portland cement, having the properties set forth in the foregoing objects.

It has been found that the foregoing objects may be realized by mixing in a dry state a hydraulic cement such, for example, as Portland cement, methyl cellulose of medium to high viscosity, and a water insoluble, reemulsifiable polyvinyl acetate. The resulting mix may then be combined with water to form a settable composition which forms a cement having unique dry curing properties and flexibility.

In describing the hydraulic cement used in accordance with this invention, conventional Portland cement will be referred to hereinafter as an illustrative example to simplify the description of the invention. It should be realized, however, that the principles of this invention are applicable to all hydraulic cements such, for example, as calcium aluminate cements, blast-furnace slag cement, and the like. Specific examples of typical hydraulic cements useful in accordance with this invention are as follows:

HYDRAULIC CEMENT A

Portland cement (ASTM Designation C150–55) is the product obtained by pulverizing clinker consisting essentially of hydraulic calcium silicates, to which no additives have been made subsequent to calcination other than water and/or calcium sulfate, except that additions not to exceed 1.0 percent of other materials may be interground with the clinker at the option of the manufacturer, provided such materials in the amount indicated have been shown to be not harmful by tests carried out or reviewed by Committee C–1 on Cement.

HYDRAULIC CEMENT B

Portland blast-furnace slag cement (ASTM Designation C205–53T) is the non-metallic product consisting essentially of silicate and alumina-silicates of calcium which is developed simultaneously with iron in a blast furnace and is produced by rapidly chilling or quenching the molten material in water, steam, or air.

HYDRAULIC CEMENT C

Portland-pozzolan cement (ASTM Designation C340–55T) is an intimately interground mixture of Portland cement clinker and pozzolan, or an intimate and uniform blend of Portland cement and fine pozzolan. The pozzolan constituent shall not be less than 15% by weight and shall not exceed 50 percent, by weight, of the Portland-pozzolan cement.

HYDRAULIC CEMENT D

Aluminous cement is a cement containing a higher percentage of alumina than the Portlands, manufactured from clinker formed from a hydrated alumina such as bauxite, and limestone.

In carrying out the principles of this invention in the manner indicated above, a single, all-powder cement-methyl cellulose-polyvinyl acetate mix is provided which can be delivered as such to the use-site, whereupon it can be practically and advantageously mixed with a specified amount of water to give a plastic, pliable composition having wide application of use.

The amount of methyl cellulose, polyvinyl acetate and water used in accordance with this invention varies depending upon the required properties of the cement. The amounts of the cement components should be such that the resulting cement possesses good dry curing properties, bonding properties and flexibility. The combined amounts of methyl cellulose and polyvinyl acetate polymer should not be so great that the resulting composition is water sensitive or that its curing time is too long. On the other hand the methyl cellulose and polyvinyl acetate should be in amounts sufficient to give good dry curing properties, bonding properties and flexibility. Too high an amount of polyvinyl acetate gives a composition which is too soft, while if too low an amount is used the cement does not have the desired flexibility.

In general, the composition of this invention contains methyl cellulose having a viscosity in 2% solution of 80–6,000 centipoises in an amount from about 0.25 to 6% by weight of the hydraulic cement. Of course, in the above indicated range, the amount of methyl cellulose required varies inversely with the viscosity of the polymer.

The water-insoluble, reemulsifiable polyvinyl acetate powder useful in this invention is disclosed in the U.S. Patent No. 2,800,463 to Morrison. As disclosed in the aforementioned patent such may be produced by atomizing an aqueous polyvinyl acetate emulsion containing a small proportion of an emulsifying agent and wherein the bulk of the polyvinyl acetate is in the form of particles having a diameter of less than 5 microns, into emulsion globules which, in drying, leave a powder composed largely of particles of a diameter up to 5 microns and aggregates of said particles, and subjecting the atomized spray of emulsion to evaporation at elevated temperatures not exceeding 250° F.

The insoluble polyvinyl acetate polymers used in accordance with this invention are generally in an amount from about 1 to 11% by weight of the hydraulic cement.

The amount of water combined with the polymer-cement mix in accordance with this invention depends upon the amount of hydraulic cement employed. In general, water is in an amount from about 20 to about 50% by weight of the hydraulic cement.

Although this invention is not limited to any theory of action, it is believed that the explanation for the effects that are obtained are as follows: methyl cellulose particles, upon contact with the mixing water that is combined with the hydraulic cement-polyvinyl acetate-methyl cellulose mixture, dissolves in this water and raises the viscosity of the liquid phase to a very high level (about 50 to 20,000 centipoises, depending upon concentration, and molecular weight, of the methyl cellulose used). By virtue of its non-ionic character no flocculation of the cement or polymer is observed. The thus increased viscosity of this liquid phase prevents or significantly retards egress of water from the mix when the latter is placed in contact with dry surfaces. Thus the "dry-curing" property has been obtained.

The powdered polyvinyl acetate, on the other hand, does not dissolve upon contact with the mixing water but is, for its part, dispersed within the aqueous phase. A dual role is exercised by the methyl cellulose in that it not only performs the "dry-curing" functions described above, but assists here in stabilizing the polyvinyl acetate polymer dispersion. Coincident, then, with hydration of the cement particles, and formation of the cement gel, there is a gradual consumption of water available to the polyvinyl acetate polymer dispersion. Eventually this free water content has so diminished that coalescence of the polyvinyl acetate particles occurs, and there results a solid polyvinyl acetate phase interweaving the cement gel structure. This solid structure is exhibited in the flexibility that is obtained in accordance with the instant invention.

The compositions have been used successfully as mortars applied to receive ceramic tile over dry masonry backings, such as cinder block, brick and concrete block.

Also, by virtue of their "dry-curing" properties they have been used over substrates where previously only organic adhesives have been employed. Gypsum wallboard and asbestos board are examples of such substrates. In these applications, the essentially inorganic compositions described below eliminate the fire and toxicity hazards often associated with use of certain solvent type organic adhesives, and offer at the same time, greater economy in the ceramic tile installation.

The exceptional dry-curing properties of the compositions of this invention allow thin layers of mortar to be used where heretofore thick mortar layers were required. Thus, a lightweight installation is obtained with consequent savings in labor, materials, space, and supporting structure.

Aside from mortar applications, the compositions of this invention have been used also as grouting compounds for pointing ceramic tile and other structural units, particularly where the "dry-curing" property is desired.

In addition, the compositions of this invention have been used very successfully for patching operations over previously installed cement or concrete. Here a strong bond is made to the old surface, and a hard, flexible patch is obtained. Conventional compositions bond not at all or do not bond well enough to the old surface and therefore require special precautions to secure the very wet conditions required to develop hardness. The novel compositions of this invention bond and harden under dry conditions, and develop also a flexibility that the conventional hydraulic cements never attain.

The overall dry curing properties, bonding properties and flexibility of the mortar compositions of this invention containing both methyl cellulose and polyvinyl acetate are far superior to cement compositions containing only methyl cellulose or polyvinyl acetate. Both methyl cellulose and polyvinyl acetate contribute to the dry curing properties of the resin. In certain applications requiring unique bonding properties such, for example, as applying patches to old concrete, a cement composition containing polyvinyl acetate but no methyl cellulose would not be satisfactory for it would not possess the required bonding properties. On the other hand, in applications requiring good flexibility, a cement composition containing methyl cellulose but no polyvinyl acetate would lack the required flexibility.

If so desired, sand may be incorporated in the compositions of this invention to reduce shrinkage. When the composition contains sand the amounts of polymer and water used with respect to the hydraulic cement is increased from the aforedescribed amounts with respect to sand-free compositions. It has been found that when sand is included in the cements of this invention, additional water is required to the extent of about 15% of the weight of sand added while the other additive materials are increased in proportion to the water increase. In general, if sand is incorporated it should not be included in an amount greater than five times the amount of hydraulic cement.

In order to illustrate the invention more specifically, the following examples are given hereinbelow. Unless otherwise indicated, the percentages or parts given are by weight:

*Example 1*

The composition—ingredients: Percent by weight
Methyl cellulose (4000 centipoise type) _____ 0.4
Reemulsifiable polyvinyl acetate (Shawinigan Company D-700) _____ 5.0
Portland cement _____ 94.6 was mixed with 30% of its weight of water and used to bond a dry absorptive (13% water absorption) ceramic 4¼" square wall tile to a very porous dry concrete block. After seven days allowed for curing a force equivalent to about 105 pounds per square inch was required to produce failure, fracture occurring between the mortar and the concrete block. In the absence of the methyl cellulose and polyvinyl acetate no bonding was obtained under these same conditions.

*Example 2*

The composition—ingredients: Percent by weight
Methyl cellulose (4000 centipoise type) _____ 0.2
Reemulsifiable polyvinyl acetate _____ 8.0
Portland cement _____ 91.8 was mixed with 28% of its weight of water. After 28 days allowed for curing a bar 6" x 1" x ¼" was supported horizontally at two points 4" apart. A centrally placed load of 2500 gms. gave a deflection of 0.0115". In the absence of methyl cellulose and polyvinyl acetate a deflection of 0.0045" was measured, this indicating the lower degree of flexibility associated with the latter, conventional mixture.

*Example 3*

The composition—ingredients: Percent by weight
Methyl cellulose (4000 centipoise type)_____ 0.14
Reemulsifiable polyvinyl acetate _____ 2.70
Portland cement _____ 30.60
Fine sand (thru U.S. Std. Sieve No. 50; retained on Sieve No. 100) _____ 66.56 was mixed with 22% of its weight of water. After curing for 28 days at a relative humidity of about 50% no linear contraction (shrinkage) of a bar made from this composition was barely detectable. A control, Portland-cement and water composition showed a linear contraction of 0.6%.

*Example 4*

The composition—ingredients: Percent by weight
Methyl cellulose (25 centipoise type) _____ 1.8
Reemulsifiable polyvinyl acetate _____ 8.0
Portland cement _____ 90.2 was mixed with 30% of its weight of water and performed similarly to the composition of Example 1.

*Example 5*

The composition—ingredients: Percent by weight
Methyl cellulose (400 centipoise type) _____ 0.7
Reemulsifiable polyvinyl acetate (Shawinigan Company) _____ 10.0
Portland cement _____ 89.3 mixed with 29% of its weight of water performed similarly ot the composition of Example 1. It was found possible also to use this composition as "dry-setting" grout for absorptive ceramic tile.

*Example 6*

The composition—ingredients: Percent by weight
Methyl cellulose (4000 centipoise type) ____ 0.20
Reemulsifiable polyvinyl acetate _____ 1.50
Portland cement _____ 46.80
Sand _____ 50.00
Asbestos _____ 1.50 mixed with 23% of its weight of water gave a mortar composition, not only suitable for application over dry cinder block or cement block, but that resisted slippage of vitreous ceramic tile when these were applied to the wet mortar on a vertical surface.

*Example 7*

The composition—ingredients: Percent by weight
Methyl cellulose (4000 centipoise type) _____ 0.4
Reemulsifiable polyvinyl acetate (Shawinigan Company D-700) _____ 5.0
Aluminous cement _____ 94.6

*Example 8*

The composition—ingredients: Percent by weight
Methyl cellulose (25 centipoise type) _____ 1.8
Reemulsifiable polyvinyl acetate _____ 8.0
Blast-furnace slag cement _____ 90.2

If so desired, the compositions of this invention when used as mortars may contain additives conventionally used in mortar compositions. Thus, asbestos, limestone, calcium chloride, perlite, vermiculite and other similar materials may also be advantageously used for such purposes as accelerating set, preventing shrinkage, preventing sagging on vertical surfaces, light-weight compositions, economy, and the like.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is as follows:

1. A composition capable of being mixed with water to form a mortar paste and comprising a hydraulic cement as its principal ingredient and the following ingredients in percentages based on the weight of the cement: methyl cellulose having a viscosity between about 80 and 6000 centipoises in 2% solution, about 0.25 to 6%, and reemulsifiable polyvinyl acetate, about 1 to 11%.

2. A composition according to claim 1 wherein the hydraulic cement is Portland cement.

3. A composition according to claim 1 wherein the hydraulic cement is an aluminous cement.

4. A composition according to claim 1 wherein the hydraulic cement is a blast-furnace slag cement.

5. A composition according to claim 1 which includes sand.

6. A composition according to claim 1 which includes asbestos.

7. The method of manufacturing a composition capable of being mixed with water to form a mortar composition, comprising mixing in the dry state, a hydraulic cement, methyl cellulose having a viscosity between 80 and 6000 centipoises in 2% solution in an amount from about 0.25 to about 6% by weight of the hydraulic cement, and reemulsifiable polyvinyl acetate in an amount from about 1 to about 11% by weight of the hydraulic cement.

8. The method according to claim 7 wherein sand is included in the composition.

9. The method according to claim 7 wherein asbestos is included in the composition.

10. The method of manufacturing a mortar composition comprising mixing in the dry state a hydraulic cement, methyl cellulose having a viscosity between 80 and 6000 centipoises in 2% solution in an amount from about 0.25 to about 6% by weight of the hydraulic cement, and reemulsifiable polyvinyl acetate in an amount from about 1 to about 11% by weight of the hydraulic cement; and the step of mixing water with said dry hydraulic cement-methyl cellulose-polyvinyl acetate mix in an amount from about 20 to about 50% by weight of the hydraulic cement.

References Cited in the file of this patent

UNITED STATES PATENTS

| | | | |
|---|---|---|---|
| 2,388,602 | Kiar | | Nov. 6, 1945 |
| 2,733,995 | Robinson | | Feb. 7, 1956 |
| 2,800,463 | Morrison | | July 23, 1957 |

FOREIGN PATENTS

| | | | |
|---|---|---|---|
| 166,556 | Australia | | Jan. 13, 1956 |